May 16, 1939.   R. C. RANDOLPH   2,158,705
FLEXIBLE SEPARATOR SCREEN
Filed March 16, 1936
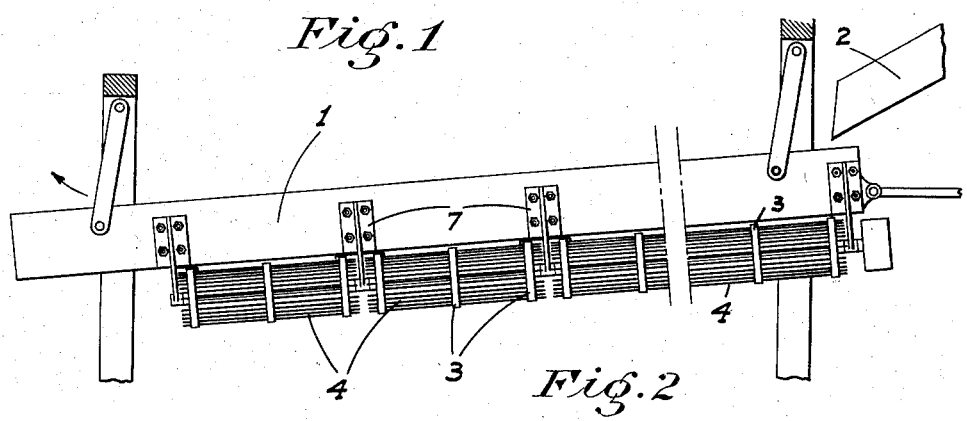
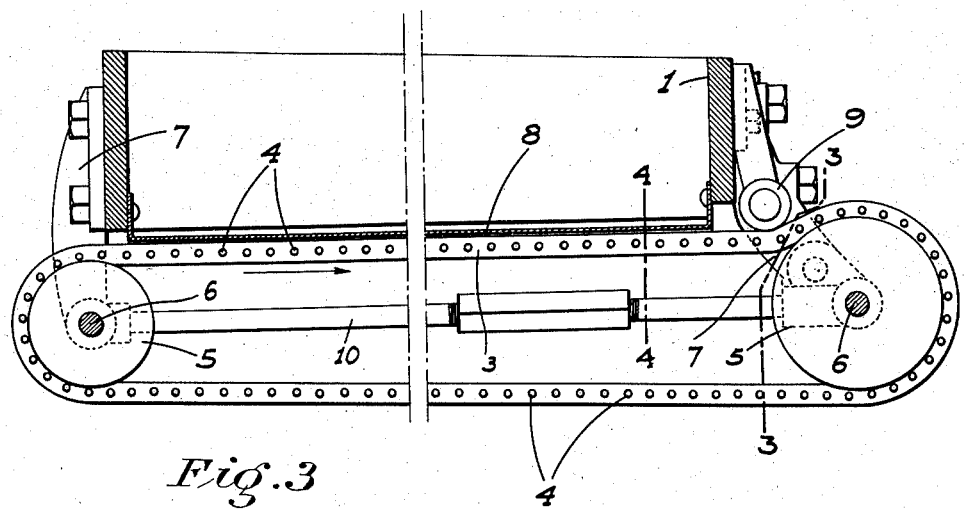
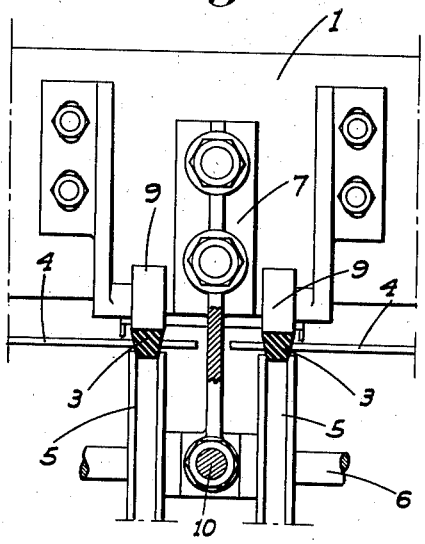
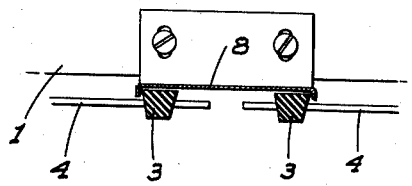
INVENTOR
R. C. Randolph
BY
ATTORNEY

UNITED STATES PATENT OFFICE 2,158,705

FLEXIBLE SEPARATOR SCREEN

Roscoe C. Randolph, Chico, Calif.

Application March 16, 1936, Serial No. 69,015

6 Claims. (Cl. 209—12)

This invention relates to the separation of almonds from their hulls, after they have been threshed or hulled. The halves of almond hulls have a tendency to remain "hinged" together—a fact which interferes with their proper discharge from the ordinary separator screens, since such hulls tend to straddle and hang from the wires or bars of the screen, instead of dropping clear.

The principal object of my invention is to provide a flexible movable screen so mounted and arranged that it is recurringly moved and shifted to an inverted position from that occupied when the nuts and hulls fall onto the same. As a result, any hulls initially straddling and hanging from the wires, will be moved therewith, and will eventually occupy an inverted position relative to the wires, so that there will be nothing to prevent the hulls from then dropping clear of the screen.

Not only therefore is the separating efficiency very high, but the screen is self-cleaning.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of a separator equipped with my improved screen.

Figure 2 is an enlarged cross section of the same.

Figure 3 is an enlarged fragmentary side elevation of the structure, looking at the side opposite from that shown in Figure 1, and with the screen in section.

Figure 4 is a fragmentary longitudinal section on line 4—4 of Figure 2.

Referring now more particularly to the character of reference on the drawing, the assembly in which my screen is used comprises a relatively long shaker table or trough 1 (of which the screen forms the bottom) mounted on a downward slant toward one end and into the upper end of which the nuts and hulls to be separated are fed from a chute 2.

The screen is preferably formed of several units as shown disposed in common alinement along the bottom of the trough 1. Each screen unit comprises a plurality of endless flexible belts 3 disposed in spaced apart relation; said belts being of rubber, as shown, and thus resilient and contractible. A multiplicity of relatively stiff wires 4 are disposed transversely of the belts in evenly and longitudinally spaced relation; said wires being passed or punctured through the belts whereby the contractibility of the rubber frictionally holds said wires in place. The belts are supported on rollers 5, the rollers of all the units being mounted on a pair of shafts 6, one of said shafts being driven.

The shafts extend parallel to and below the side walls of the trough outwardly thereof, and are supported from said walls at points between the different units by suitable bearing brackets 7.

The belts thus extend transversely of the trough, while the wires extend lengthwise thereof.

The webs of brackets 7 necessarily projecting between the ends of the wires of adjacent units, said ends are spaced apart somewhat as shown. The upper runs of the screens extend across the bottom of the trough in clearance relation to the lower edges of the side walls thereof, and to prevent almonds from possibly dropping between the spaced ends of the wires, transverse plates 8 are mounted in the trough over such spaces, the plates also closely overhanging the adjacent belts and being turned down just beyond the belts as shown in Figure 4.

A number of the belt and screen units is used rather than a single one, for the reason that in a large capacity separator, the length of the screen structure (considered lengthwise of the table or trough 1) must be considerable. With a single unit, however, it would not be possible to support the roller shafts 6 intermediate their ends, and such shafts would have to be made unduly heavy if bending, and a binding tendency at the end bearings, is to be avoided. Also, the short screen units are easier to manufacture, ship and assemble.

The upper run of the screen is disposed on a transverse slope, and to alter such slope, I mount vertically adjustable idler rollers 9 on the side walls of the trough at the high ends of the screen, which ride on the upper runs of the endmost belts of the different units.

In operation, the trough is shaken longitudinally by any suitable means, being hung so that a "bouncing" action is imparted to the nuts and hulls with the shaking movement. At the same time the belt units are driven so that their upper runs move toward the high side thereof.

The nuts themselves being incapable of passing between the wires, remain supported on the screen until the rear end of the trough is reached, when they drop from the trough and screen into suitable receptacles placed thereunder. Any half-hulls being narrower than the nuts, drop through the screen wires, the constant movement of the wires aiding in this discharge.

Any whole hulls, falling on and straddling the wires, and so failing to be discharged, are carried under the high side of the trough, and as the belts pass around the adjacent rollers, the wires and hulls hanging therefrom are of course inverted in position, causing the hulls to drop of themselves from supporting engagement with the wires.

The screens are set on an upward transverse slope in the direction of travel of the upper runs of the screens to prevent the possibility of any nuts themselves being carried under the adjacent wall of trough 1 at the high side of the screens, which would cause their undesired discharge and intermingling with the hulls intentionally discharged at that point. The upward slope of the screens, aided by the agitation thereof, retards the movement of the nuts in that direction, and causes them to be properly maintained between the sides of the trough. The screens being also set with a considerable downward slant from end to end of the shaker table, the wires of the screens are also disposed on a downward slant from end to end, so that the nuts supported thereon tend to slide down the wires to the desired point of discharge at the rear lower end of the table.

The opposed brackets 7 (which on one side are formed of a pair of parts hinged together) are connected in line with the opposed shafts by adjustable rods 10, so that the tension of the belts as a whole, regardless of the rollers 9, may be altered and adjusted to suit.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

I claim:

1. A separator structure comprising a trough disposed with a downward slope toward one end and adapted to receive material to be separated on its upper end, the bottom of the trough comprising an endless belt separator screen including a series of parallel wires extending lengthwise of the trough and means to drive the screen in a direction transversely of the trough.

2. A structure as in claim 1 with means supporting the wires so that the series thereof is disposed on an upward slope transversely of the trough in the direction of movement of the screen.

3. A separator structure comprising a trough disposed with a downward slope toward one end and adapted to receive material to be separated on its upper end, an endless belt separator screen, one run of which forms the bottom of the trough, and means to drive said run of the screen in a direction transversely of the trough.

4. A structure as in claim 3, in which said run of the screen is disposed with an upward slope to one side of the trough in the direction of movement of said screen.

5. A structure as in claim 3, in which said run of the screen is disposed with an upward slope to one side of the trough in the direction of movement of said run of the screen, there being a discharge opening extending lengthwise of the trough formed between said unit at the high side thereof and the adjacent side of the trough.

6. An endless separator screen comprising a pair of flexible endless belts of puncturable and contractible material, said belts being of substantial cross sectional area, and a plurality of straight stiff wires closely spaced longitudinally of the endless belts and extending therebetween, the end portions of the wires being punctured through the belts whereby said contractible material, when punctured by the wires, will frictionally hold the same in place.

ROSCOE C. RANDOLPH.